(12) United States Patent
Kawase et al.

(10) Patent No.: US 6,642,335 B2
(45) Date of Patent: Nov. 4, 2003

(54) FLOW-AND-LEVELING AGENTS FOR POWDER COATINGS

(75) Inventors: Masafumi Kawase, Koshigaya (JP); Yasuhiro Oiwa, Soka (JP); Shigehiro Kawahito, Soka (JP)

(73) Assignee: Kusumoto Chemicals Ltd, Tokyo (JP)

( * ) Notice: Subject to any disclaimer, the term of this patent is extended or adjusted under 35 U.S.C. 154(b) by 0 days.

(21) Appl. No.: 10/081,237

(22) Filed: Feb. 25, 2002

(65) Prior Publication Data
US 2003/0100692 A1 May 29, 2003

(30) Foreign Application Priority Data
May 23, 2001 (JP) ........................................ 2001-153593

(51) Int. Cl.⁷ .............................................. C08F 130/08
(52) U.S. Cl. .................... 526/279; 526/320; 526/328.5; 526/333
(58) Field of Search ................................ 526/279, 320, 526/328.5, 333

(56) References Cited

U.S. PATENT DOCUMENTS 5,035,849 A * 7/1991 Uemura et al. ............. 264/255
5,767,171 A * 6/1998 Matsubara et al. ......... 523/122

FOREIGN PATENT DOCUMENTS

JP    21977/1986    5/1986

* cited by examiner

Primary Examiner—Helen L. Pezzuto
(74) Attorney, Agent, or Firm—Sherman & Shalloway

(57) ABSTRACT

Provided are flow-and-leveling agents for powder coatings which provide the coated surfaces with a flow-and-leveling property by blending into powder coatings taking a serious view of finishing and which improves coating defects such as ruptures and craters to contribute to a rise in the appearance in powder coating. The above flow-and-leveling agents are (meth)acrylic acid ester base copolymers containing a trimethylsilyl group in a proportion of 2 to 65% by weight and having a number average molecular weight of 1000 to 60000.

21 Claims, No Drawings

FLOW-AND-LEVELING AGENTS FOR POWDER COATINGS

TECHNICAL FIELD TO WHICH THE INVENTION BELONGS

The present invention relates to novel acryl silicone base flow-and-leveling agents for powder coatings which can provide the coating surfaces with a flow-and-leveling property by adding them to powder coatings in small amounts.

PRIOR ART

In general powder coatings are inferior in a flow-and-leveling property on the coating surfaces, and therefore it has tended to be difficult to use them for applications in which high appearance is required. In recent years, however, it has been tried to use powder coatings in place of solvent base coatings for the purpose of environmental pollution measures. For example, it is investigated to use them for top coating for automobiles. This has required flow-and-leveling agents for powder coatings having high functions. Acryl base polymers, modified silicone oils and organic waxes have so far been used as flow-and-leveling agents in compliance with this requirement. Powdery flow-and-leveling agents of a hybrid type making use of acryl base polymers and organic waxes are proposed in, for example, Japanese Patent Publication No. 21977/1986.

The Problems to be Solved by the Invention

However, a satisfactory flow-and-leveling property are not necessarily obtained with these conventional techniques in the fields requiring a high appearance such as uses for automobiles which are researched in recent years, and when large amounts of flow-and-leveling agents are added in order to obtain a good appearance, adverse effects are exerted on a layer-to-layer adhesion in recoating or adverse effects such as roughening of the recoated films are often observed.

Accordingly, an object of the present invention is to provide flow-and-leveling agents capable of being utilized for uses requiring a high appearance which has not been obtained with conventional flow-and-leveling agents for powder coatings.

Means for Solving the Problems

Various investigations repeated by the present inventors have resulted in finding that a flow-and-leveling property which is so good as has never been can be provided onto the coating surface by blending powder coatings with flow-and-leveling agents of (1), (2), (3) and (4) described below and that adverse effects are not exerted on the recoating property.

(1) A flow-and-leveling agent for a powder coating comprising a trimethylsilyl group-containing copolymer obtained by copolymerizing a reactive monomer (A) having a trimethylsilyl group represented by a structural formula:

—Si(CH$_3$)$_3$ in a molecular structure and/or a reactive monomer (B) having a trimethylsilyl group in the form of a tris(trimethylsiloxy)silyl group represented by a structural formula:

—Si[OSi(CH$_3$)$_3$]$_3$ in a molecular structure with a (meth)acrylic acid ester (C) represented by a formula:

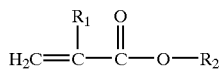

[wherein R$_1$ represents a hydrogen atom or methyl, and R$_2$ represents an alkyl group or alkenyl group having 1 to 18 carbon atoms] and/or a (meth)acrylic acid ester (D) represented by a formula:

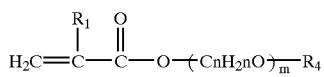

[wherein R$_3$ represents a hydrogen atom or methyl; R$_4$ represents a hydrogen atom or an alkyl group having 1 to 18 carbon atoms; n represents an integer of 2, 3 or 4, and m represents an integer of 1 to 50], wherein the above trimethylsilyl group-containing polymer contains a trimethylsilyl group originating in the monomers (A) and/or (B) in a proportion of 2 to 65% by weight, preferably 5 to 40% by weight and has a number average molecular weight of 1000 to 60000, preferably 2000 to 30000.

(2) A flow-and-leveling agent for a powder coating comprising a trimethylsilyl group-containing copolymer obtained by reacting a copolymer of a multifunctional monomer into which a trimethylsilyl group or a tris(trimethylsiloxy)silyl group can be introduced and the (meth)acrylic acid esters (C) and/or (D) described in the above item (1) with a trimethylsilyl group-containing compound and/or a tris(trimethylsiloxy)silyl group-containing compound, wherein the above trimethylsilyl group-containing polymer contains a trimethylsilyl group in a proportion of 2 to 65% by weight, preferably 5 to 40% by weight and has a number average molecular weight of 1000 to 60000, preferably 2000 to 30000.

(3) A flow-and-leveling agent for a powder coating comprising a trimethylsilyl group-containing copolymer obtained by copolymerizing the monomer (A) and/or (B) described in the above item (1) and the (meth)acrylic acid esters (C) and/or (D) described in the above item (1) with a reactive monomer (E) which can be copolymerized with them, wherein the above copolymer contains a trimethylsilyl group originating in the monomers (A) and/or (B) in a proportion of 2 to 65% by weight, preferably 5 to 40% by weight and a copolymerization unit originating in the monomer (E) in a proportion of not exceeding 50% by weight and has a number average molecular weight of 1000 to 60000, preferably 2000 to 30000.

(4) A flow-and-leveling agent for a powder coating comprising a trimethylsilyl group-containing copolymer obtained by reacting a copolymer of the multifunctional monomer described in the above item (2), the (meth)acrylic acid esters (C) and/or (D) described in the above item (1) and the reactive monomer described in the above item (3) with a trimethylsilyl group-containing compound and/or a tris(trimethylsiloxy)silyl group-containing compound, wherein the above trimethylsilyl group-containing copolymer contains a trimethylsilyl group in a proportion of 2 to 65% by weight, preferably 5 to 40% by weight and a copolymerization unit originating in the monomer (E) in a proportion of not exceeding 50% by weight and has a number average molecular weight of 1000 to 60000, preferably 2000 to 30000.

If a proportion of a trimethylsilyl group originating in the monomers (A) and/or (B) based on the copolymer is smaller than 2% by weight, the satisfactory flow-and-leveling property is not obtained. On the other hand, if it is more than 65% by weight, adverse effects are more likely to be exerted in recoating a coating film. When both the monomers (A) and (B) are used in combination, a proportion of the respective amounts thereof is optional, and they can be used in combination so that a proportion of a trimethylsilyl group based on the copolymer is 2 to 65% by weight.

The (meth)acrylic acid esters of the formulas (C) and/or (D) are copolymerized in order to provide an effect of obtaining a good flow-and-leveling property, and the satisfactory flow-and-leveling property can not be obtained with monomers other than them. When the number (m) of alkylene glycol units contained in the (meth)acrylic acid ester (D) exceeds 50, not only the satisfactory flow-and-leveling property can not be obtained, but also there is the concern that adverse effects in terms of the physical properties are exerted on the coating film. When both the monomers (C) and (D) are used in combination, a proportion of the respective amounts thereof is optional, and they can be used in combination so that a proportion of a trimethylsilyl group originating in the monomers (A) and/or (B) based on the copolymer is 2 to 65% by weight.

The copolymer of the (meth)acrylic acid esters (C) and/or (D) with the multifunctional monomer is subjected to addition reaction or condensation reaction with a trimethylsilyl group-condaining compound and/or a tris(trimethylsiloxy) silyl group-containing compound whereby a trimethylsilyl group can be introduced into the above copolymer. The copolymer obtained by this method provides as well the effect of endowing the coating surface with a good flow-and-leveling property if the trimethylsilyl group is introduced into the copolymer in a proportion of 2 to 65% by weight, preferably 5 to 40% by weight.

If the trimethylsilyl group is contained in the copolymer in a proportion of 2 to 65% by weight, preferably 5 to 40% by weight, an acryl silicone copolymer containing copolymerization units originating in the other reactive monomer (E) in a range in which the proportion based on the copolymer does not exceed 50% by weight provides as well the effect of endowing the coating surface with a good flow-and-leveling property.

If the copolymer has a number average molecular weight of smaller than 1000 or larger than 60000, the above copolymer does not have a sufficiently high ability to spread on a coating surface in coating, so that the satisfactory flow-and-leveling property can not be obtained.

The examples of the reactive monomer (A) having a trimethylsilyl group and the reactive monomer (B) having a trimethylsilyl group in the form of a tris(trimethylsiloxy) silyl group include 3-methacryloxypropyltrimethylsilane, 3-methacryloxypropyltris(trimethylsiloxy)silane, and vinyltris(trimethylsiloxy)silane. The examples of the trimethylsilyl group-condaining compounds and the tris (trimethylsiloxy)silyl group-containing compounds include trimethylchlorosilane, hexamethyldisilazane, tris (trimethylsiloxy)hydrosilane, 3-aminopropyltris (trimethylsiloxy)silane and 3-mercaptopropyltris (trimethylsiloxy)silane.

The (meth)acrylic acid alkyl or alkenyl ester (C) in which an alkyl group or an alkenyl group has 1 to 18 carbon atoms includes, for example, methyl (meth)acrylate, ethyl (meth) acrylate, normal propyl (meth)acrylate, isopropyl (meth) acrylate, normal butyl (meth)acrylate, isobutyl (meth) acrylate, tertiary butyl (meth)acrylate, normal octyl (meth) acrylate, 2-ethylhexyl (meth)acrylate, isononyl (meth) acrylate, lauryl (meth)acrylate, tridecyl (meth)acrylate, myristyl (meth)acrylate, hexadecyl (meth)acrylate, stearyl (meth)acrylate, cyclohexyl (meth)acrylate, benzyl (meth) acrylate and isobonyl (meth)acrylate.

The (meth)acrylic acid ester (D) includes 2-methoxyethyl (meth)acrylate, 2-ethoxyethyl (meth)acrylate, 2-butoxyethyl (meth)acrylate, 2-octoxyethyl (meth)acrylate, 2-lauroxyethyl (meth)acrylate, 3-methoxybutyl (meth) acrylate, 4-methoxybutyl (meth)acrylate, ethylcarbitol (meth)acrylate, methoxypolyethylene glycol (meth)acrylate [the number (m) of the ethylene glycol units is 1 to 50], methoxypolypropylene glycol (meth)acrylate [the number (m) of the propylene glycol units is 1 to 50], methoxypoly (ethylene-propylene)glycol (meth)acrylate [the total number (m) of the number of the ethylene glycol units and the number of the propylene glycol units is 2 to 50], methoxypoly(ethylene-tetramethylene)glycol (meth) acrylate [the total number (m) of the number of the ethylene glycol units and the number of the tetramethylene glycol units is 2 to 50], butoxypoly(ethylene-propylene)glycol (meth)acrylate [the total number (m) of the number of the ethylene glycol units and the number of the propylene glycol units is 2 to 50], octoxypoly(ethylene-propylene)glycol (meth)acrylate [the total number (m) of the number of the ethylene glycol units and the number of the propylene glycol units is 2 to 50], lauroxypolyethylene glycol (meth)acrylate [the number (m) of the ethylene glycol units is 1 to 50] and lauroxypoly(ethylene-propylene)glycol (meth)acrylate [the total number (m) of the number of the ethylene glycol units and the number of the propylene glycol units is 2 to 50].

The examples of the multifunctional monomer into which a trimethylsilyl group or a tris(trimethylsiloxy)silyl group can be introduced include, for example, (meth)acrylic acid, 2-hydroxyethyl (meth)acrylate, glycidyl (meth)acrylate, 2-isocyanatoethyl (meth)acrylate, those in which $R_4$ is a hydrogen atom in the formula representing the (meth)acrylic acid ester (D), allyl glycidyl ether, 2-hydroxyethyl vinyl ether and 4-hydroxybutyl vinyl ether.

The monomer (E) shall bot be restricted, and the examples thereof include, for example, (meth)acrylic acid esters other than (C) and (D) described above, such as behenyl (meth) acrylate and nonylphenoxypolyethylene glycol (meth) acrylate; acrylamides such as acrylamide, N,N-dimethylacrylamide, N,N-diethylacrylamide, N-isopropylacrylamide, diacetoneacrylamide and acryloyl-morpholine; aromatic hydrocarbon base vinyl compounds such as styrene, α-methylstyrene, chlorostyrene and vinyltoluene; vinyl esters or allyl compounds such as vinyl acetate, vinyl propionate and diallyl phthalate; vinyl ethers such as ethyl vinyl ether, normal propyl vinyl ether, isopropyl vinyl ether, normal butyl vinyl ether, isobutyl vinyl ether, tertiary butyl vinyl ether, normal octyl vinyl ether, 2-ethylhexyl vinyl ether, methyl vinyl ether and cyclohexyl vinyl ether; vinyl chloride; vinylidene chloride; chloroprene; propylene; butadiene; isoprene; and fluoroolefinmaleimide.

A method for synthesizing the copolymer of the present invention includes an emulsion polymerization method, a suspension polymerization method, a solution polymerization method and a bulk polymerization method. Azo base polymerization initiators and peroxides are used as an initiator for carrying out polymerization.

Capable of being used as a method for introducing a trimethylsilyl group into the copolymer is a method in which polymerization reaction is carried out and then a compound having a trimethylsilyl group is added or condensed.

The present invention is an invention related to the functions of the copolymer and therefore shall by no means be restricted by the synthetic process of the copolymer.

Addition of the flow-and-leveling agents for powder coatings according to the present invention to coatings to which high appearance is required, for example, acryl powder coatings for automobile top coating and high appearance polyester melamine powder coatings for primarily home electric appliances PCM coating makes it possible to provide the coating surface with a sufficiently high flow-and-leveling property in coating and prevent ruptures and craters from being produced.

In respect to a method for adding the flow-and-leveling agents for powder coatings according to the present invention to the coatings, they are preferably added in preparing the coatings in the form of a master batch with the resins for the coatings or a powder mixture thereof with organic waxes.

An addition amount of the flow-and-leveling agents for powder coatings according to the present invention is varied depending on the kind of the resins for coatings and the blend compositions of pigments and is usually 0.01 to 5% by weight, preferably 0.1 to 2% by weight based on the coating vehicles in terms of the solid matters. If the addition amount is smaller than 0.01% by weight, the coating surface can not be provided with a sufficiently high flow-and-leveling property. On the other hand, if it is more than 5% by weight, adverse effects are more likely to be exerted on the physical properties of the coating film.

Effects of the Invention

The flow-and-leveling agent for a powder coating according to the present invention is a novel acryl silicone base copolymer and makes it possible to provide so good flow-and-leveling property as has never been without exerting adverse effects on the layer-to-layer adhesion in recoating.

EXAMPLES

Next, the present invention shall be explained in further details with reference to examples, but the present invention shall not be restricted to these examples.

"Parts" and "%" in the following mean "parts by weight" and "% by weight" respectively.

Production Example 1

A reactor of 1000 ml equipped with a stirrer, a reflux condenser, a dropping funnel, a thermometer and a nitrogen gas-introducing port was charged with 150 parts of toluene and heated to 110° C. while introducing nitrogen gas. Then, the following solution (a-1) was dropwise added at a constant rate through the dropping funnel in 2 hours.

| Solution (a-1) | |
|---|---|
| Ethyl acrylate [(meth)acrylic acid ester (C)] | 150 parts |
| 2-Ethoxyethyl acrylate [(meth)acrylic acid ester (D)] | 75 parts |
| 3-Methacryloxypropyltris(trimethylsiloxy)-silane [monomer (B)] | 75 parts |
| Toluene | 150 parts |
| t-Butylperoxy-2-ethylhexanoate | 15 parts |

After one hour since finishing dropwise adding the solution (a-1), 3 parts of t-butylperoxy-2-ethylhexanoate was added, and the reaction was further continued for 2 hours while keeping a temperature of 110° C. After finishing the reaction, toluene was removed by means of a rotary evaporator to obtain an additive [A-1]. The synthesized acryl silicone base copolymer had a number average molecular weight of 4500 in terms of polystyrene, which was determined by gel permeation chromatography.

Production Example 2

An additive [A-2] was obtained in the same manner as in Production Example 1, except that the following solution (a-2) was substituted for the solution (a-1) used in Production Example 1.

| Solution (a-2) | |
|---|---|
| Methoxypolyethylene glycol methacrylate (the number (m) of the ethylene glycol units is 4) [(meth)acrylic acid ester (D)] | 60 parts |
| Isobutyl acrylate [(meth)acrylic acid ester (C)] | 180 parts |
| 3-Methacryloxypropyltris (trimethylsiloxy)-silane [monomer (B)] | 60 parts |
| Toluene | 100 parts |
| t-Butylperoxy-2-ethylhexanoate | 15 parts |

The synthesized acryl silicone base copolymer had a number average molecular weight of 6000 in terms of polystyrene, which was determined by gel permeation chromatography.

Production Example 3

An additive [A-3] was obtained in the same manner as in Production Example 1, except that the following solution (a-3) was substituted for the solution (a-1) used in Production Example 1.

| Solution (a-3) | |
|---|---|
| 2-Butoxyethyl acrylate [(meth)acrylic acid ester (D)] | 150 parts |
| Isobutyl vinyl ether [monomer (E)] | 90 parts |
| 3-Methacryloxypropyltris (trimethylsiloxy) - silane [monomer (B)] | 60 parts |
| Toluene | 100 parts |
| t-Butylperoxy-2-ethylhexanoate | 15 parts |

The synthesized vinyl silicone base copolymer had a number average molecular weight of 3500 in terms of polystyrene, which was determined by gel permeation chromatography Production Example 4

An additive [A-4] was obtained in the same manner as in Production Example 1, except that the following solution (a-4) was substituted for the solution (a-1) used in Production Example 1.

| Solution (a-4) | |
|---|---|
| Lauroxypoly(ethylene-propylene) glycol acrylate (the number of the ethylene glycol units is 8 and the number of the propylene glycol units is 6) [(meth)acrylic acid ester (D)] | 120 parts |
| Tertiary butyl acrylate [(meth)acrylic acid ester (C)] | 180 parts |
| 3-Methacryloxypropyltrimethylsilane [monomer (A)] | 100 parts |
| Toluene | 150 parts |
| t-Butylperoxy-2-ethylhexanoate | 6 parts |

The synthesized acryl silicone base copolymer had a number average molecular weight of 10000 in terms of polystyrene, which was determined by gel permeation chromatography.

Production Example 5

An additive [A-5] was obtained in the same manner as in Production Example 1, except that the following solution (a-6) was substituted for the solution (a-1) used in Production Example 1.

| Solution (a-5) | |
| --- | --- |
| 2-Methoxyethyl acrylate [(meth)acrylic acid ester (D)] | 120 parts |
| 2-Ethylhexyl acrylate [(meth)acrylic acid ester (C)] | 120 parts |
| 3-Methacryloxypropyltris(trimethylsiloxy)silane [monomer (B)] | 60 parts |
| Toluene | 50 parts |
| t-Butylperoxy-2-ethylhexanoate | 1 part |

The synthesized acryl silicone base copolymer had a number average molecular weight of 40000 in terms of polystyrene, which was determined by gel permeation chromatography.

Production Example 6

An additive [A-6] was obtained in the same manner as in Production Example 1, except that the following solution (a-6) was substituted for the solution (a-1) used in Production Example 1.

| Solution (a-6) | |
| --- | --- |
| Ethyl acrylate [(meth)acrylic acid ester (C)] | 140 parts |
| Normal butyl acrylate [(meth)acrylic acid ester (C)] | 145 parts |
| 3-Methacryloxypropyltris(trimethylsiloxy)silane [monomer (B)] | 15 parts |
| Toluene | 150 parts |
| t-Butylperoxy-2-ethylhexanoate | 15 parts |

The synthesized acryl silicone base copolymer had a number average molecular weight of 5000 in terms of polystyrene, which was determined by gel permeation chromatography.

Production Example 7

An additive [A-7] was obtained in the same manner as in Production Example 1, except that the following solution (a-7) was substituted for the solution (a-1) used in Production Example 1.

| Solution (a-7) | |
| --- | --- |
| 2-Ethoxyethyl acrylate [(meth)acrylic acid ester (D)] | 100 parts |
| Styrene [(monomer (E)] | 50 parts |
| 3-Methacryloxypropyltrimethylsilane [monomer (A)] | 150 parts |
| Toluene | 100 parts |
| t-Butylperoxy-2-ethylhexanoate | 7.5 parts |

The synthesized acryl silicone base copolymer had a number average molecular weight of 8000 in terms of polystyrene, which was determined by gel permeation chromatography.

Production Example 8

The reaction was carried out in the same manner as in Production Example 1, and then the following solution (a-8b) was added thereto to obtain an additive [A-8], except that the following solution (a-8a) was substituted for the solution (a-1) used in Production Example 1.

| Solution (a-8a) | |
| --- | --- |
| 2-Ethoxyethyl acrylate [(meth)acrylic acid ester (D)] | 250 parts |
| 2-Isocyanatoethyl methacrylate [multifunctional monomer] | 50 parts |
| Toluene | 100 parts |
| t-Butylperoxy-2-ethylhexanoate | 7.5 parts |
| Solution (a-8b) | |
| 3-Aminopropyltris(trimethylsiloxy)silane [tris(trimethylsiloxy)silyl group-containing compound] | 150 parts |

After one hour since finishing dropwise adding the solution (a-8a), 3 parts of t-butylperoxy-2-ethylhexanoate was added, and the reaction was further continued for 2 hours while keeping a temperature of 110° C. After finishing the reaction, the solution was cooled down to a room temperature, and the solution (a-8b) was dropwise added thereto in one hour. After left standing for 24 hours, toluene was removed by means of a rotary evaporator to obtain an additive [A-8].

The synthesized acryl silicone base copolymer had a number average molecular weight of 5000 in terms of polystyrene, which was determined by gel permeation chromatography.

Production Example 9

The reaction was carried out in the same manner as in Production Example 1, and then the following solution (a-9b) was added thereto to obtain an additive [A-9], except that the following solution (a-9a) was substituted for the solution (a-1) used in Production Example 1.

| Solution (a-9a) | |
| --- | --- |
| 2-Ethoxyethyl acrylate [(meth)acrylic acid ester (D)] | 200 parts |
| Tertiary butyl vinyl ether [monomer (E)] | 50 parts |
| 2-Isocyanatoethyl methacrylate [multifunctional monomer] | 50 parts |
| Toluene | 50 parts |
| t-Butylperoxy-2-ethylhexanoate | 15 parts |
| Solution (a-9b) | |
| 3-Aminopropyltris(trimethylsiloxy)silane [tris(trimethylsiloxy) silyl group-containing compound] | 150 parts |

After one hour since finishing dropwise adding the solution (a-9a), 3 parts of t-butylperoxy-2-ethylhexanoate was added, and the reaction was further continued for 2 hours while keeping a temperature of 110° C. After finishing the reaction, the solution was cooled down to a room temperature, and the solution (a-9b) was dropwise added in one hour. After left standing for 24 hours, toluene was removed by means of a rotary evaporator to obtain an additive [A-9].

The synthesized vinyl silicone base copolymer had a number average molecular weight of 3000 in terms of polystyrene, which was determined by gel permeation chromatography.

Comparative Production Example 1

An additive [N-1] was obtained in the same manner as in Production Example 1, except that the following solution (n-1) was substituted for the solution (a-1) used in Production Example 1.

| Solution (n-1) | |
| --- | --- |
| Ethyl acrylate [(meth)acrylic acid ester (C)] | 150 parts |
| 2-Ethoxyethyl acrylate [(meth)acrylic acid ester (D)] | 145 parts |
| 3-Methacryloxypropyltris(trimethylsiloxy)-silane [monomer (B)] | 5 parts |
| Toluene | 150 parts |
| t-Butylperoxy-2-ethylhexanoate | 15 parts |

The synthesized acryl silicone base copolymer had a number average molecular weight of 6000 in terms of polystyrene, which was determined by gel permeation chromatography.

Comparative Production Example 2

An additive [N-2] was obtained in the same manner as in Production Example 1, except that the following solution (n-2) was substituted for the solution (a-1) used in Production Example 1.

| Solution (n-2) | |
| --- | --- |
| Ethyl acrylate [(meth)acrylic acid ester (C)] | 15 parts |
| 2-Ethoxyethyl acrylate [(meth)acrylic acid ester (D)] | 15 parts |
| 3-Methacryloxypropyltris(trimethylsiloxy)-silane [monomer (B)] | 270 parts |
| Toluene | 150 parts |
| t-Butylperoxy-2-ethylhexanoate | 10 parts |

The synthesized acryl silicone base copolymer had a number average molecular weight of 12000 in terms of polystyrene, which was determined by gel permeation chromatography.

Comparative Production Example 3

An additive [N-3] was obtained in the same manner as in Production Example 1, except that the following solution (n-3) was substituted for the solution (a-1) used in Production Example 1.

| Solution (n-3) | |
| --- | --- |
| Ethyl acrylate [(meth)acrylic acid ester (C)] | 80 parts |
| 2-Ethoxyethyl acrylate [(meth)acrylic acid ester (D)] | 35 parts |
| 3-Methacryloxypropyltris(trimethylsiloxy)-silane [monomer (B)] | 35 parts |
| Toluene | 300 parts |
| t-Butylperoxy-2-ethylhexanoate | 15 parts |

The synthesized acryl silicone base copolymer had a number average molecular weight of 800 in terms of polystyrene, which was determined by gel permeation chromatography.

Comparative Production Example 4

An additive [N-4] was obtained in the same manner as in Production Example 1, except that the following solution (n-4) was substituted for the solution (a-1) used in Production Example 1.

| Solution (n-4) | |
| --- | --- |
| Ethyl acrylate [(meth)acrylic acid ester (C)] | 150 parts |
| 2-Ethoxyethyl acrylate [(meth)acrylic acid ester (D)] | 75 parts |
| 3-Methacryloxypropyltris(trimethylsiloxy)-silane [monomer (B)] | 75 parts |
| Toluene | 50 parts |
| t-Butylperoxy-2-ethylhexanoate | 0.2 part |

The synthesized acryl silicone base copolymer had a number average molecular weight of 75000 in terms of polystyrene, which was determined by gel permeation chromatography.

Comparative Production Example 5

An additive [N-5] was obtained in the same manner as in Production Example 1, except that the following solution (n-5) was substituted for the solution (a-1) used in Production Example 1.

| Solution (n-5) | |
| --- | --- |
| Ethyl acrylate [(meth)acrylic acid ester (C)] | 150 parts |
| 2-Ethoxyethyl acrylate [(meth)acrylic acid ester (D)] | 75 parts |
| γ-Methacryloxypropyltrimethoxysilane [silane which does not correspond to the monomer (A) and the monomer (B)] | 75 parts |
| Toluene | 150 parts |
| t-Butylperoxy-2-ethylhexanoate | 15 parts |

The synthesized acryl silicone base copolymer had a number average molecular weight of 4000 in terms of polystyrene, which was determined by gel permeation chromatography.

Comparative Production Example 6

Byk-361 (manufactured by Byk Chemie Co., Ltd.) was used as a publicly known flow-and-leveling agent comprising an acryl base polymer. This was designated as an additive [N-6].

Comparative Production Example 7

KP-322 (manufactured by Shin-etsu Chemical Co., Ltd.) was used as a publicly known flow-and-leveling agent of a silicone base. This was a methylphenyl-modified silicone oil. This was designated as an additive [N-7].

TABLE 1

Acryl silicone polymers in production examples

| | Sample name | Number average molecular weight | Active Ingredient (%) |
|---|---|---|---|
| Production Example 1 | A-1 | 4500 | 100 |
| Production Example 2 | A-2 | 6000 | 100 |
| Production Example 3 | A-3 | 3500 | 100 |
| Production Example 4 | A-4 | 10000 | 100 |
| Production Example 5 | A-5 | 40000 | 100 |
| Production Example 6 | A-6 | 5000 | 100 |
| Production Example 7 | A-7 | 8000 | 100 |
| Production Example 8 | A-8 | 5000 | 100 |
| Production Example 9 | A-9 | 3000 | 160 |

TABLE 2

Comparative production examples

| | Sample name | Number average molecular weight | Active ingredient (%) |
|---|---|---|---|
| Comparative Production Example 1 | N-1 | 6000 | 100 |
| Comparative Production Example 2 | N-2 | 12000 | 100 |
| Comparative Production Example 3 | N-3 | 800 | 100 |
| Comparative Production Example 4 | N-4 | 75000 | 100 |
| Comparative Production Example 5 | N-5 | 4000 | 100 |
| Comparative Production Example 6 | N-6 | 2500 | 100 |
| Comparative Production Example 7 | N-7 | 4000 | 100 |

Coating Test Example 1

Flow-and-leveling Property Test with Clear Type Powder Coating Coating

An acryl clear powder coating composition having a proportion shown in Table 3 was tested for a flow-and-leveling property.
[Preparation of Master Batch]
An acryl resin (PD-3402) to be used was molten at 170° C., and the flow-and-leveling agents shown in Table 1 or Table 2 were evenly dispersed therein while stirring at a high speed by means of a disper so that a concentration of 10% in terms of a solid content was obtained. After cooled down, the mixture was crushed by means of a pin mill and passed through a screen of 32 mesh to obtain a 10% acryl resin master batch composition.
[Preparation of Acryl Powder Coating]
An acryl base powder coating having a composition shown in Table 3 which comprised the master batch composition prepared in the manner described above was dry-blended and then molten and kneaded by means of an extruder maintained at 90 to 100° C. After cooled down, the mixture was crushed by means of a pin mill and passed through a screen of 150 mesh to obtain a white powdery clear type coating composition.
[Application of Acryl Powder Coating]
Three sheets of heat resistant stainless steel plates (0.5× 70×100 mm) were prepared for the respective additives, and the powder coatings prepared were sprayed thereon by an electrostatic powder coating method so that a cured film thickness became 60 $\mu$m. Then, the coated plates described above were baked at 145° C. for 30 minutes.
[Evaluation of Flow-and-leveling Property of Acryl Powder Coatings]
The flow-and-leveling property was evaluated according to five grades of "best" (5) to "worst" (1) by visually observing the appearance of the surfaces. Further, the SW (short wave) values and the LW (long wave) values were determined by means of a wave scan (manufactured by Byk Chemie Co., Ltd.). They are values showing the degree of the flow-and-leveling property and show that the lower the value, the better the flow-and-leveling property. Further, the numbers of ruptures and craters observed on the coating films were visually counted and evaluated according to five grades of "best" (5) to "worst" (1). The results thereof are shown in Table 6.

Coating Test Example 2

Evaluation of Recoating Property

A metallic base coating shown in Table 4 was diluted with a diluent solvent so that the coating had a viscosity of 13 seconds in terms of Ford cup #4 and then applied on the coating film prepared in Coating Test Example 1 so that the coating film after drying had a thickness of 15 $\mu$m. This coating film was dried at a room temperature for 5 minutes, and then a top coat clear coating compositions shown in Table 5 was applied thereon by means of an air spray so that a thickness of 30 $\mu$m was obtained. The coating film was left standing at a room temperature for 5 minutes and then baked for 20 minutes in an oven of 120° C. After cooled down to a room temperature, it was evaluated for a recoating adhesion by a cross cut adhesion test.

Further, isopropyl alcohol was dropped on another coating film prepared in Coating Test Example 1 and naturally dried. The additive got together on the coating film after drying and stayed in a concentrated state. The metallic base coating and the top coat clear coating were applied on this coating film in the same manner as described above by means of an air spray and baked for 20 minutes in an oven of 140° C. After cooled down to a room temperature, the coating film was evaluated for the state of a change in a color of the base coating in a part where the additive got together.

The tests of the coating films were evaluated in the following manners. A change in the color by isopropyl alcohol (hereinafter referred to as a damaged-by-IPA property) and the flow-and-leveling property after recoating were visually evaluated according to five grades of "best" (5) to "worst" (1). In the test of the recoating adhesion, 100 cross-cut sections having the same width of 1 mm were prepared in a square of 10 mm×10 mm on the coated plate by means of a cutter, and a peeling test was carried out by a cellophane adhesive tape to count the number of the remaining sections of the recoating film. The test results thereof are shown in Table 7.

TABLE 3

Formulation of acryl powder clear coating

| Raw material name | Amount (parts) | Manufacturer of raw material |
| --- | --- | --- |
| Acryl resin: PD-3402 | 78.0 | Mitsui Toatsu Chemical Co., Ltd. |
| Curing agent: dodecanedioic acid | 17.5 | Wako Pure Chemicals Ind. Co., Ltd. |
| Flow-and-leveling agent: acryl resin master batch | 5.0 | |
| Defoaming agent: benzoin | 0.3 | Wako Pure Chemicals Ind. Co., Ltd. |

TABLE 4

Formulation of metallic base coating

| Raw material name | Amount (parts) | Manufacturer of raw material |
| --- | --- | --- |
| Acrydic A-405 | 60.0 | Dainippon Ink & Chemicals, Inc. |
| Super Becamine L-117-60 | 20.0 | Dainippon Ink & Chemicals, Inc |
| Alpaste 7620NS | 8.0 | Toyo Aluminium Co., Ltd. |
| Xylene | 21.4 | |
| Disparlon 6900-20X | 3.0 | Kusumoto Chemicals, Ltd. |

*) Diluent solvent: toluene/ethyl acetate/Solvesso #100/isobutyl alcohol = 50/20/20/10

TABLE 5

Formulation of top coat clear coating

| Raw material name | Amount (parts) | Manufacturer of raw material |
| --- | --- | --- |
| Johncryl 500 | 203.6 | Johnson Polymer K.K. |
| Cymel 325 | 69.7 | Mitsui Cytec, Ltd. |
| Naeure 5528 | 0.88 | King Industries, Inc. |
| Flow-and-leveling agent: Disparlon LHP-90 | 0.7 | Kusumoto Chemicals, Ltd. |
| Defoaming agent: Disparlon AP-10 | 1.75 | Kusumoto Chemicals, Ltd. |
| Diluent solvent *) | 97.7 | |

*) Diluent solvent: Solvesso #100/methyl isobutyl ketone/butyl alcohol = 30/30/40

TABLE 6

Test results of flow-and-leveling agents for acryl powder clear coating

| Sample name | Addition amount (%) | Flow-and-leveling property | SW value | LW value | Crater |
| --- | --- | --- | --- | --- | --- |
| A-1 | 0.5 | 5 | 6.0 | 3.1 | 5 |
| A-2 | 0.5 | 5 | 6.5 | 3.2 | 5 |
| A-3 | 0.5 | 5 | 3.5 | 4.9 | 5 |
| A-4 | 0.5 | 4 | 9.4 | 6.2 | 5 |
| A-5 | 0.5 | 3 | 14.7 | 9.3 | 4 |
| A-6 | 0.5 | 4 | 16.3 | 10.5 | 3 |
| A-7 | 0.5 | 4 | 17.5 | 3.6 | 5 |
| A-8 | 0.5 | 5 | 6.8 | 4.5 | 5 |
| A-9 | 0.5 | 5 | 7.5 | 4.8 | 5 |
| N-1 | 0.5 | 3 | 7.5 | 25.5 | 1 |
| N-2 | 0.5 | 4 | 6.0 | 14.7 | 5 |
| N-3 | 0.5 | 1 | 16.2 | 50.5 | 1 |
| N-4 | 0.5 | 1 | 38.9 | 56.4 | 1 |
| N-5 | 0.5 | 3 | 14.2 | 31.5 | 1 |
| N-6 | 0.5 | 3 | 7.5 | 12.0 | 3 |
| N-7 | 0.5 | 3 | 3.2 | 7.9 | 4 |

TABLE 7

Test results of recoating property

| Sample name | Addition amount (%) | Dameged-by IPA property | Flow-and-leveling property after recoating | Layer-to-layer adhesion (cross cut test) |
| --- | --- | --- | --- | --- |
| A-1 | 0.5 | 5 | 5 | 100/100 |
| A-2 | 0.5 | 5 | 5 | 100/100 |
| A-3 | 0.5 | 5 | 5 | 100/100 |
| A-4 | 0.5 | 5 | 5 | 100/100 |
| A-5 | 0.5 | 5 | 5 | 100/100 |
| A-6 | 0.5 | 4 | 5 | 95/100 |
| A-7 | 0.5 | 3 | 3 | 100/100 |
| A-8 | 0.5 | 5 | 5 | 100/100 |
| A-9 | 0.5 | 5 | 5 | 100/100 |
| N-1 | 0.5 | 1 | 5 | 0/100 |
| N-2 | 0.5 | 1 | 1 | 100/100 |
| N-3 | 0.5 | 1 | 5 | 25/100 |
| N-4 | 0.5 | 2 | 5 | 0/100 |
| N-5 | 0.5 | 4 | 5 | 0/100 |
| N-6 | 0.5 | 2 | 5 | 0/100 |
| N-7 | 0.5 | 1 | 3 | 100/100 |

What is claimed is:

1. A method for imparting flow-and-leveling properties to a powder coating, comprising the step of:

adding a trimethylsilyl group-containing polymer obtained by copolymerizing a reactive monomer (A) having a trimethylsilyl group represented by a structural formula:

—Si(CH$_3$)$_3$ in a molecular structure and/or a reactive monomer (B) having a trimethylsilyl group in the form of a tris (trimethylsiloxy)silyl group represented by a structural formula:

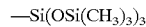
—Si(OSi(CH$_3$)$_3$)$_3$ in a molecular structure with a (meth)acrylic acid ester (C) represented by a formula:

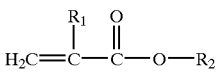

$$H_2C = \underset{R_1}{C} - \underset{\parallel}{\overset{O}{C}} - O - R_2$$

(wherein R$_1$ represents a hydrogen atom or methyl, and R$_2$ represents an alkyl group or alkenyl group having 1 to 18 carbon atoms) and/or a (meth)acrylic acid ester (D) represented by a formula:

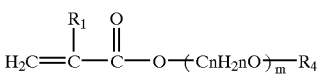

$$H_2C = \underset{R_1}{C} - \underset{\parallel}{\overset{O}{C}} - O - (C_nH_{2n}O)_m - R_4$$

(wherein R$_3$ represents a hydrogen atom or methyl; R$_4$ represents a hydrogen atom or an alkyl group having 1 to 18 carbon atoms; n represents an integer of 2, 3 or 4, and m represents an integer of 1 to 50), wherein the above trimethylsilyl group-containing polymer contains a trimethylsilyl group originating in the monomer (A) and/or (B) in a proportion of 2 to 65% by weight and has a number average molecular weight of 1000 to 60000, to the powder coating.

2. A method for imparting flow-and-leveling properties to a powder coating, comprising the step of:

adding a trimethylsilyl group-containing copolymer obtained by reacting a copolymer of a multifunctional monomer into which a trimethylsilyl group or a tris(trimethylsiloxy)silyl group can be introduced and a (meth)acrylic acid ester (C) represented by a formula:

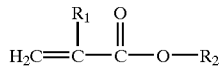

(wherein $R_1$ represents a hydrogen atom or methyl, and $R_2$ represents an alkyl group or alkenyl group having 1 to 18 carbon atoms) and/or a (meth)acrylic acid ester (D) represented by a formula:

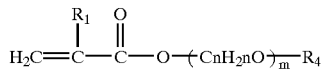

(wherein $R_3$ represents a hydrogen atom or methyl; $R_4$ represents a hydrogen atom or an alkyl group having 1 to 18 carbon atoms; n represents an integer of 2, 3 or 4, and m represents an integer of 1 to 50) with a trimethylsilyl group-containing compound and/or a tris(trimethylsiloxy)silyl group-containing compound, wherein the above trimethylsilyl group-containing polymer contains a trimethylsilyl group in a proportion of 2 to 65% by weight and has a number average molecular weight of 1000 to 60000, to the powder coating.

3. The method for imparting flow-and-leveling properties to a powder coating, comprising the step of:

adding a trimethylsilyl group-containing copolymer obtained by copolymerizing the monomers (A) of claim 1 and/or (B) of claim 1 and the (meth)acrylic acid esters (C) of claim 1 and/or (D) of claim 1 with a reactive monomer (E) which can be copolymerized with them wherein the above copolymer contains a trimethylsilyl group originating in the monomers (A) and/or (B) in a proportion of 2 to 65% by weight and a copolymerization unit originating in the monomer (E) in a proportion of not exceeding 50% by weight and has a number average molecular weight of 1000 to 60000, to the powder coating.

4. The method for imparting flow-and-leveling properties to a powder coating, comprising the step of:

adding a trimethylsilyl group-containing copolymer obtained by reacting a copolymer of a multifunctional monomer into which a trimethylsilyl group or a tris(trimethylsiloxy)silyl group can be introduced, the (meth)acrylic acid esters (C) of claim 1 and/or (D) of claim 1 and a copolymerizable reactive monomer (E) with a trimethylsilyl group-containing compound and/or a tris(trimethylsiloxy)silyl group-containing compound, wherein the above trimethylsilyl group-containing polymer contains a trimethylsilyl group in a proportion of 2 to 65% by weight and a copolymerization unit originating in the monomer (E) in a proportion of not exceeding 50% by weight and has a number average molecular weight of 1000 to 60000, to the powder coating.

5. The method as described in any of claims 1 to 4, wherein the monomer (A) and/or the monomer (B) are selected from the group consisting of 3-methacryloxypropyltrimethylsilane, 3-methacryloxypropyltris(trimethylsiloxy)silane, vinyltris(trimethylsiloxy)silane.

6. The method as described in any claims of claims 1 to 4, wherein the trimethylsilyl group-coating compound and/or the tris(trimethylsiloxy)silyl group-containing compound are selected from the group consisting of trimethylchlorosilane, hexamethyldisilazane, tris(trimethylsiloxy)hydrosilane, 3-aminopropyltris(trimethylsiloxy)silane and 3-mercaptopropyltris(trimethylsiloxy)silane.

7. The method as described in any of claims 1 to 4, wherein the (meth)acrylic acid ester (C) is selected from the group consisting of methyl (meth)acrylate, ethyl(meth)acrylate, normal propyl (meth)acrylate, isopropyl (meth)acrylate, normal butyl (meth)acrylate, isobutyl (meth)acrylate, tertiary butyl (meth)acrylate, normal octyl (meth)acrylate, 2-ethylhexyl (meth)acrylate, isononyl (meth)acrylate, lauryl (meth)acrylate, tridecyl (meth)acrylate, myristyl (meth)acrylate, hexadecyl (meth)acrylate, stearyl (meth)acrylate, cyclohexyl (meth)acrylate, benzyl (meth)acrylate and isobonyl (meth)acrylate.

8. The method as described in any of claims 1 to 4, wherein the (meth)acrylic acid ester (D) is selected from the group consisting of 2-methoxyethyl (meth)acrylate, 2-ethoxyethyl (meth)acrylate, 2-butoxyethyl (meth)acrylate, 2-octoxyethyl (meth)acrylate, 2-lauroxyethyl (meth)acrylate, 3-methoxybutyl (meth)acrylate, 4-methoxybutyl (meth)acrylate, ethylcarbitol (meth)acrylate, methoxypolyethylene glycol (meth)acrylate, methoxypolypropylene glycol (meth)acrylate, methoxypoly(ethylene-propylene)glycol (meth)acrylate, methoxypoly(ethylene-tetramethylene) glycol (meth)acrylate, butoxypoly(ethylene-propylene) glycol (meth)acrylate, octoxypoly(ethylene-propylene) glycol (meth)acrylate, lauroxypolyethylene glycol (meth)acrylate and lauroxypoly(ethylene-propylene)glycol (meth)acrylate.

9. The method as described in claim 2 or 4, wherein the multifunctional monomer is selected from the group consisting of (meth)acrylic acid, 2-hydroxyethyl(meth)acrylate, glycidyl (meth)acrylate, 2-isocyanatoethyl (meth)acrylate, those in which $R_4$ is a hydrogen atom in the formula representing the (meth)acrylic acid ester (D), allyl glycidyl ether, 2-hydroxyethyl vinyl ether and 4-hydroxybutyl vinyl ether.

10. The method as described in claim 3 or 4, wherein the monomer (E) is selected from the group consisting of (meth)acrylic acid esters other than (C) and (D) described above, such as behenyl (meth)acrylate and nonylphenoxypolyethylene glycol (meth)acrylate; acrylamides such as acrylamide, N,N-dimethylacrylamide, N,N-diethylacrylamide, N-isopropylacrylamide, diacetoneacrylamide and acroylmorpholine; aromatic hydrocarbon base vinyl compounds such as styrene, α-methylstyrene, chlorostyrene and vinyltoluene; vinyl esters or allyl compounds such as vinyl acetate, vinyl propionate and diallyl phthalate; vinyl ethers such as ethyl vinyl ether, normal propyl vinyl ether, isopropyl vinyl ether, normal butyl vinyl ether, isobutyl vinyl ether, tertiary butyl vinyl ether, normal octyl vinyl ether, 2-ethylhexyl vinyl ether, methyl vinyl ether and cyclohexyl vinyl ether; vinyl chloride; vinylidene chloride; chloroprene; propylene; butadiene; isoprene; and fluoroolefin-maleimide.

11. A flow-and-leveling agent for a powder coating, comprising:

a trimethylsilyl group-containing polymer obtained by copolymerizing a reactive monomer (A) having a trimethylsilyl group represented by a structural formula:

—Si(CH$_3$)$_3$ in a molecular structure and/or a reactive monomer (B) having a trimethylsilyl group in the form of a tris(trimethylsiloxy)silyl group represented by a structural formula:

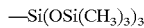
—Si(OSi(CH$_3$)$_3$)$_3$ in a molecular structure with a (meth)acrylic acid ester (C) represented by a formula:

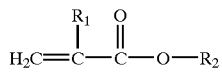

(wherein R$_1$ represents a hydrogen atom or methyl, and R$_2$ represents an alkyl group or alkenyl group having 1 to 18 carbon atoms) and/or a (meth)acrylic acid ester (D) represented by a formula:

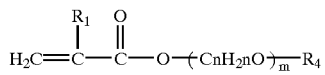

(wherein R$_3$ represents a hydrogen atom or methyl; R$_4$ represents a hydrogen atom or an alkyl group having 1 to 18 carbon atoms; n represents an integer of 2, 3 or 4, and m represents an integer of 1 to 50), wherein the above trimethylsilyl group-containing polymer contains a trimethylsilyl group-containing polymer contains a trimethylsilyl group originating in the monomer (A) and/or (B) in a proportion of 2 to 65% by weight and has a number average molecular weight of 1000 to 60000, wherein the monomer (A) and/or the monomer (B) are selected from the group consisting of 3-ethacryloxypropyltrimethylsilane, 3-methacryloxypropyltris(trimethylsiloxy)silane, vinyltris(trimethylsiloxy)silane.

12. A flow-and-leveling agent for a powder coating, comprising:

a trimethylsilyl group-containing polymer obtained by copolymerizing a reactive monomer (A) having a trimethylsilyl group represented by a structural formula:

—Si(CH$_3$)$_3$ in a molecular structure and/or a reactive monomer (B) having a trimethylsilyl group in the form of a tris(trimethylsiloxy)silyl group represented by a structural formula:

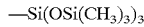
—Si(OSi(CH$_3$)$_3$)$_3$ in a molecular structure with a (meth)acrylic acid ester (C) represented by a formula:

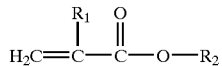

(wherein R$_1$ represents a hydrogen atom or methyl, and R$_2$ represents an alkyl group or alkenyl group having 1 to 18 carbon atoms) and/or a (meth)acrylic acid ester (D) represented by a formula:

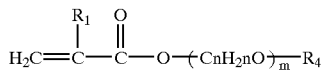

(wherein R$_3$ represents a hydrogen atom or methyl; R$_4$ represents a hydrogen atom or an alkyl group having 1 to 18 carbon atoms; n represents an integer of 2, 3 or 4, and m represents an integer of 1 to 50), wherein the above trimethylsilyl group-containing polymer contains a trimethylsilyl group-containing polymer contains a trimethylsilyl group originating in the monomer (A) and/or (B) in a proportion of 2 to 65% by weight and has a number average molecular weight of 1000 to 60000, wherein the trimethylsilyl group-coating compound and/or the tris(trimethylsiloxy)silyl group-containing compound are selected from the group consisting of trimethylchlorosilane, hexamethyldisilazane, tris(trimethylsiloxy)hydrosilane, 3-aminopropyltris(trimethylsiloxy)silane and 3-mercaptopropyltris(trimethylsiloxy)silane.

13. A flow-and-leveling agent for a powder coating, comprising:

a trimethylsilyl group-containing copolymer obtained by reacting a copolymer of a multifunctional monomer into which a trimethylsilyl group or a tris(trimethylsiloxy)silyl group can be introduced and a (meth)acrylic acid ester (C) represented by a formula:

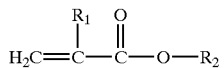

(wherein R$_1$ represents a hydrogen atom or methyl, and R$_2$ represents an alkyl group or alkenyl group having 1 to 18 carbon atoms) and/or a (meth)acrylic acid ester (D) represented by a formula:

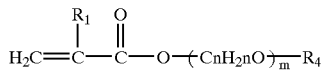

(wherein R$_3$ represents a hydrogen atom or methyl; R$_4$ represents a hydrogen atom or an alkyl group having 1 to 18 carbon atoms; n represents an integer of 2, 3 or 4, and m represents an integer of 1 to 50) with a trimethylsilyl group-containing compound and/or a tris(trimethylsiloxy)silyl group-containing compound, wherein the above trimethylsilyl group-containing polymer contains a trimethylsilyl group in a proportion of 2 to 65% by weight and has a number average molecular weight of 1000 to 60000, wherein the monomer (A) and/or the monomer (B) are selected from the group consisting of 3-ethacryloxypropyltrimethylsilane, 3-methacryloxypropyltris(trimethylsiloxy)silane, vinyltris(trimethylsiloxy)silane.

14. A flow-and-leveling agent for a powder coating, comprising:

a trimethylsilyl group-containing copolymer obtained by reacting a copolymer of a multifunctional monomer into which a trimethylsilyl group or a tris(trimethylsiloxy)silyl group can be introduced and a (meth)acrylic acid ester (C) represented by a formula:

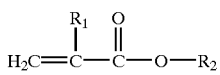

(wherein $R_1$ represents a hydrogen atom or methyl, and $R_2$ represents an alkyl group or alkenyl group having 1 to 18 carbon atoms) and/or a (meth)acrylic acid ester (D) represented by a formula:

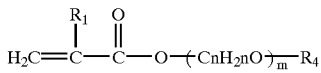

(wherein $R_3$ represents a hydrogen atom or methyl; $R_4$ represents a hydrogen atom or an alkyl group having 1 to 18 carbon atoms; n represents an integer of 2, 3 or 4, and m represents an integer of 1 to 50) with a trimethylsilyl group-containing compound and/or a tris(trimethylsiloxy) silyl group-containing compound, wherein the above trimethylsilyl group-containing polymer contains a trimethylsilyl group in a proportion of 2 to 65% by weight and has a number average molecular weight of 1000 to 60000, wherein the trimethylsilyl group-coating compound and/or the tris(trimethylsiloxy)silyl group-containing compound are selected from the group consisting of trimethylchlorosilane, hexamethyldisilazane, tris(trimethylsiloxy)hydrosilane, 3-aminopropyltris(trimethylsiloxy)silane and 3-mercaptopropyltris(trimethylsiloxy)silane.

15. The flow-and-leveling agent for a powder coating, comprising a trimethylsilyl group-containing copolymer of claim 11 or 12 obtained by copolymerizing the monomers (A) and/or (B) and the (meth)acrylic acid esters (C) and/or (D) with a reactive monomer (E) which can be copolymerized with them wherein the above copolymer contains a trimethylsilyl group originating in the monomers (A) and/or (B) in a proportion of 2 to 65% by weight and a copolymerization unit originating in the monomer (E) in a proportion of not exceeding 50% by weight and has a number average molecular weight of 1000 to 60000.

16. The flow-and-leveling agent for a powder coating, comprising a trimethylsilyl group-containing copolymer of claim 13 or 14 obtained by reacting the copolymer of a multifunctional monomer the (meth)acrylic acid esters (C) and/or (D) and the trimethylsilyl group-containing compound and/or a tris(trimethylsiloxy)silyl group-containing compound with a reactive monomer (E), wherein the above trimethylsilyl group-containing polymer contains a trimethylsilyl group in a proportion of 2 to 65% by weight and a copolymerization unit originating in the monomer (E) in a proportion of not exceeding 50% by weight and has a number average molecular weight of 1000 to 60000.

17. The flow-and-leveling agent for a powder coating as described in any of claims 11 to 14, wherein the (meth) acrylic acid ester (C) is selected from the group consisting of methyl (meth)acrylate, ethyl(meth)acrylate, normal propyl (meth)acrylate, isopropyl (meth)acrylate, normal butyl (meth)acrylate, isobutyl (meth)acrylate, tertiary butyl (meth)acrylate, normal octyl (meth)acrylate, 2-ethylhexyl (meth)acrylate, isononyl (meth)acrylate, lauryl (meth)acrylate, tridecyl (meth)acrylate, myristyl (meth)acrylate, hexadecyl (meth)acrylate, stearyl (meth)acrylate, cyclohexyl (meth)acrylate, benzyl (meth)acrylate and isobonyl (meth)acrylate.

18. The flow-and-leveling agent for a powder coating as described in any of claims 11 to 14, wherein the (meth) acrylic acid ester (D) is selected from the group consisting of 2-methoxyethyl (meth)acrylate, 2-ethoxyethyl (meth) acrylate, 2-butoxyethyl (meth)acrylate, 2-octoxyethyl (meth)acrylate, 2-lauroxyethyl (meth)acrylate, 3-methoxybutyl (meth)acrylate, 4-methoxybutyl (meth) acrylate, ethylcarbitol (meth)acrylate, methoxypolyethylene glycol (meth)acrylate, methoxypolypropylene glycol (meth) acrylate, methoxypoly (ethylene-propylene)glycol (meth) acrylate, methoxypoly (ethylene-tetramethylene)glycol (meth)acrylate, butoxypoly (ethylene-propylene)glycol (meth)acrylate, octoxypoly (ethylene-propylene)glycol (meth)acrylate, lauroxypolyethylene glycol (meth)acrylate and lauroxypoly(ethylene-propylene)glycol (meth)acrylate.

19. The flow-and-leveling agent for a powder coating as described in claim 13 or 14, wherein the multifunctional monomer is selected from the group consisting of (meth) acrylic acid, 2-hydroxyethyl(meth)acrylate, glycidyl (meth) acrylate, 2-isocyanatoethyl (meth)acrylate, those in which $R_4$ is a hydrogen atom in the formula representing the (meth)acrylic acid ester (D), allyl glycidyl ether, 2-hydroxyethyl vinyl ether and 4-hydroxybutyl vinyl ether.

20. The flow-and-leveling agent for a powder coating as described in claim 15, wherein the monomer (E) is selected from the group consisting of (meth)acrylic acid esters other than (C) and (D) described above, such as behenyl (meth) acrylate and nonylphenoxypolyethylene glycol (meth) acrylate, acrylamides such as acrylamide, N,N-dimethylacrylamide, N,N-diethylacrylamide, N-isopropylacrylamide, diacetoneacrylamide and acroylmorpholine; aromatic hydrocarbon base vinyl compounds such as styrene, α-methylstyrene, chlorostyrene and vinyltoluene; vinyl esters or allyl compounds such as vinyl acetate, vinyl propionate and diallyl phthalate vinyl ethers such as ethyl vinyl ether, normal propyl vinyl ether, isopropyl vinyl ether, normal butyl vinyl ether, isobutyl vinyl ether, tertiary butyl vinyl ether, normal octyl vinyl ether, 2-ethylhexyl vinyl ether, methyl vinyl ether and cyclohexyl vinyl ether; vinyl chloride; vinylidene chloride; chloroprene; propylene; butadiene; isoprene; and fluoroolefinmaleimide.

21. The flow-and-leveling agent for a powder coating as described in claim 16, wherein the monomer (E) is selected from the group consisting of (meth)acrylic acid esters other than (C) and (D) described above, such as behenyl (meth) acrylate and nonylphenoxypolyethylene glycol (meth) acrylate; acrylamides such as acrylamide, N,N-dimethylacrylamide, N,N-diethylacrylamide, N-isopropylacrylamide, diacetoneacrylamide and acroylmorpholine; aromatic hydrocarbon base vinyl compounds such as styrene, α-methylstyrene, chlorostyrene and vinyltoluene; vinyl esters or allyl compounds such as vinyl acetate, vinyl propionate and diallyl phthalate; vinyl ethers such as ethyl vinyl ether, normal propyl vinyl ether, isopropyl vinyl ether, normal butyl vinyl ether, isobutyl vinyl ether, tertiary butyl vinyl ether, normal octyl vinyl ether, 2-ethylhexyl vinyl ether, methyl vinyl ether and cyclohexyl vinyl ether; vinyl chloride; vinylidene chloride; chloroprene; propylene; butadiene; isoprene; and fluoroolefinmaleimide.

* * * * *